United States Patent
Chao et al.

(10) Patent No.: US 9,912,695 B1
(45) Date of Patent: Mar. 6, 2018

(54) TECHNIQUES FOR USING A HONEYPOT TO PROTECT A SERVER

(71) Applicant: QUALCOMM Incorporated, San Diego, CA (US)

(72) Inventors: Hui Chao, San Jose, CA (US); Nayeem Islam, Palo Alto, CA (US); Seyed Ali Ahmadzadeh, San Jose, CA (US)

(73) Assignee: QUALCOMM Incorporated, San Diego, CA (US)

( * ) Notice: Subject to any disclaimer, the term of this patent is extended or adjusted under 35 U.S.C. 154(b) by 0 days.

(21) Appl. No.: 15/481,102

(22) Filed: Apr. 6, 2017

(51) Int. Cl.
*H04L 29/06* (2006.01)

(52) U.S. Cl.
CPC ........ *H04L 63/1491* (2013.01); *H04L 63/105* (2013.01); *H04L 63/1425* (2013.01)

(58) Field of Classification Search
CPC ............. H04L 63/1491; H04L 63/1425; H04L 63/105
See application file for complete search history.

(56) References Cited

U.S. PATENT DOCUMENTS

| | | | | |
|---|---|---|---|---|
| 8,151,348 B1* | 4/2012 | Day | ................... | H04L 63/1408 709/224 |
| 8,510,838 B1* | 8/2013 | Sun | ........................ | G06F 21/53 713/150 |
| 8,549,643 B1* | 10/2013 | Shou | ..................... | G06F 21/556 455/410 |
| 8,973,142 B2 | 3/2015 | Shulman et al. | | |
| 9,117,091 B2 | 8/2015 | Tucker | | |
| 9,495,188 B1* | 11/2016 | Ettema | ................ | G06F 9/45533 |
| 9,535,731 B2 | 1/2017 | Ashley et al. | | |
| 9,716,727 B1* | 7/2017 | Seger | ................... | H04L 63/1491 |
| 2004/0111636 A1* | 6/2004 | Baffes | ................... | G06F 21/554 726/23 |
| 2004/0128529 A1* | 7/2004 | Blake | .................. | H04L 63/1441 726/25 |
| 2004/0162994 A1* | 8/2004 | Cohen | ................ | H04L 63/1491 726/22 |
| 2008/0018927 A1* | 1/2008 | Martin | .................... | G06F 21/74 358/1.15 |
| 2009/0328216 A1* | 12/2009 | Rafalovich | ......... | H04L 43/0876 726/23 |
| 2010/0077483 A1* | 3/2010 | Stolfo | ................... | G06F 21/554 726/24 |
| 2013/0242743 A1* | 9/2013 | Thomas | .............. | H04L 63/0227 370/236 |

(Continued)

OTHER PUBLICATIONS

Website: "SCIgen—An Automatic CS Paper Generator", Retrieved from internet on Mar. 6, 2017, https://pdos.csail.mit.edu/archive/scigen/#examples, pp. 1-5.

*Primary Examiner* — Michael Pyzocha
(74) *Attorney, Agent, or Firm* — Hunter Clark PLLC

(57) ABSTRACT

Techniques for operating a security system are provided. An example method for operating a security system according to the disclosure includes monitoring interactions of an unauthorized party with a computing environment configured to simulate the server, generating synthetic content based on the unauthorized party's interactions with the computing environment, and configuring the security system to permit the unauthorized party to access the synthetic content responsive to the unauthorized party's interactions with the security system.

31 Claims, 9 Drawing Sheets

(56) References Cited

U.S. PATENT DOCUMENTS

| | | | |
|---|---|---|---|
| 2013/0263226 A1* | 10/2013 | Sudia | H04L 63/1466 726/4 |
| 2014/0096229 A1 | 4/2014 | Burns et al. | |
| 2014/0298469 A1* | 10/2014 | Marion | G06F 21/55 726/23 |
| 2015/0365438 A1* | 12/2015 | Carver | H04L 63/1441 726/1 |
| 2016/0134658 A1* | 5/2016 | Akiyama | G06F 21/55 726/23 |
| 2016/0149950 A1* | 5/2016 | Ashley | G06F 9/45533 726/23 |
| 2017/0006061 A1* | 1/2017 | Murphy | H04L 63/1441 |
| 2017/0099305 A1* | 4/2017 | Schwartz | H04L 63/1491 |
| 2017/0126736 A1* | 5/2017 | Urias | H04L 63/1491 |
| 2017/0134423 A1* | 5/2017 | Sysman | H04L 63/1491 |
| 2017/0149787 A1* | 5/2017 | Niemela | H04L 63/10 |
| 2017/0149832 A1* | 5/2017 | Touboul | G06F 21/55 |
| 2017/0206349 A1* | 7/2017 | Zhang | G06F 21/6218 |
| 2017/0208085 A1* | 7/2017 | Steelman | H04L 63/1433 |

* cited by examiner

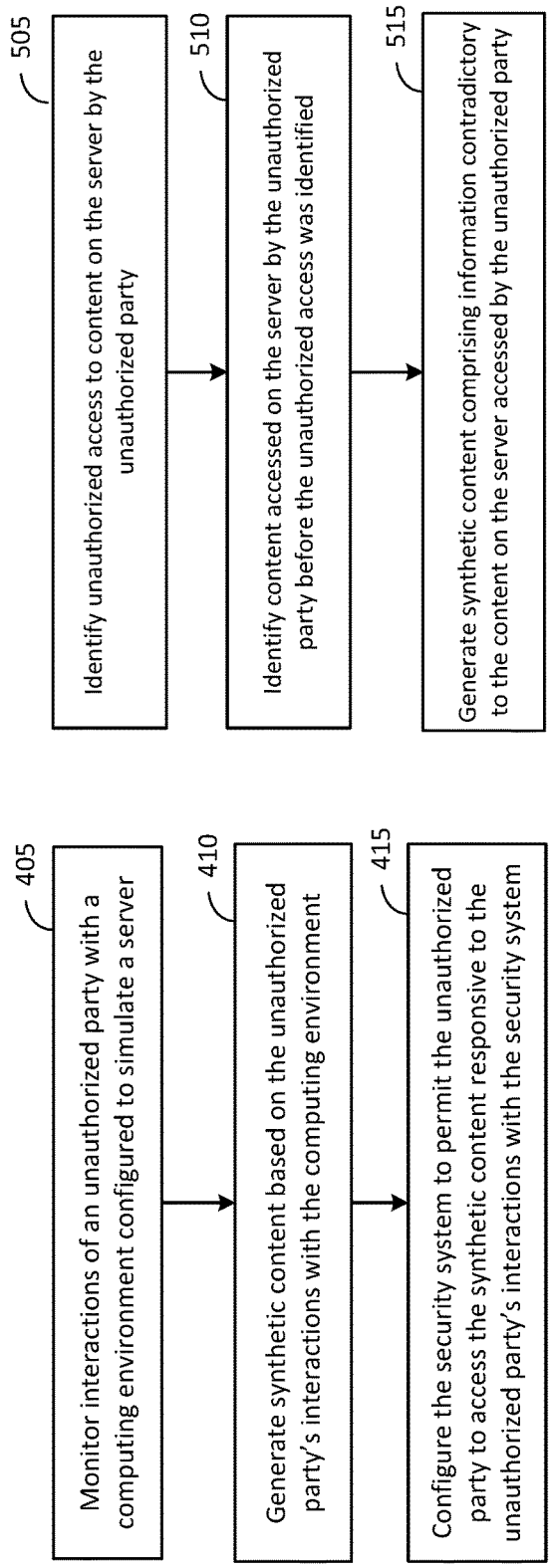

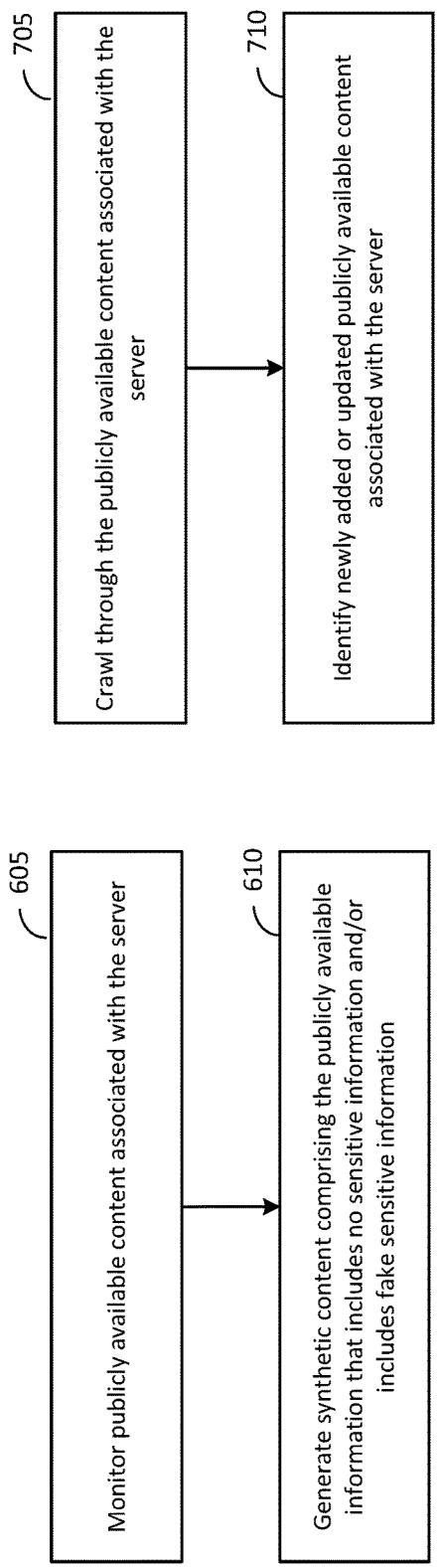

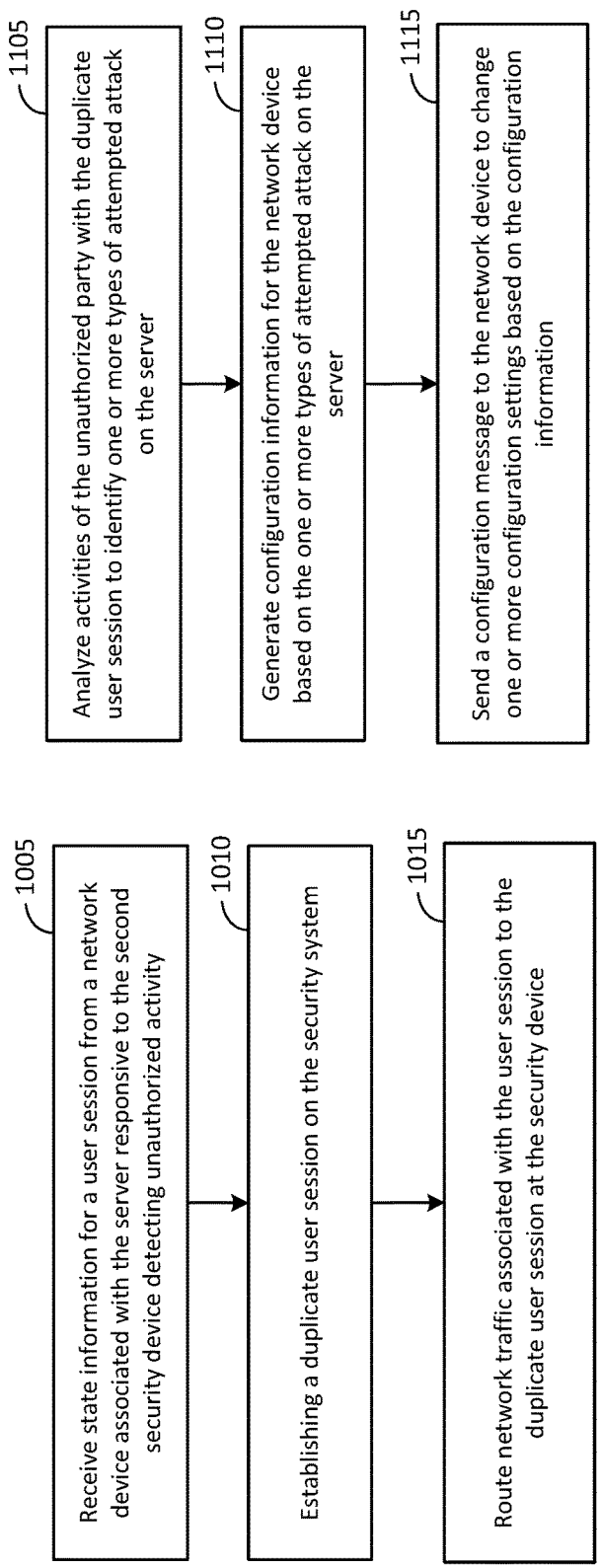

TECHNIQUES FOR USING A HONEYPOT TO PROTECT A SERVER

BACKGROUND

Publicly facing network devices and services are subject to intrusion and unauthorized activity by unauthorized users. Such devices as services can also be subject to denial of service attacks and other types of attacks that can render the device or service unusable. One approach is to use a honeypot to draw an unauthorized user away from critical components of a networked service. Another approach is to incorporate a decoy application or content on a network device or one of the hardware components supporting a networked service. The decoy application or content can be something that an authorized user would not access. The decoy can be monitored and if accessed can trigger a response that can alert an administrator and/or block the unauthorized access.

SUMMARY

An example method for operating a security system according to the disclosure includes monitoring interactions of an unauthorized party with a computing environment configured to simulate the server, generating synthetic content based on the unauthorized party's interactions with the computing environment, and configuring the security system to permit the unauthorized party to access the synthetic content responsive to the unauthorized party's interactions with the security system.

Implementations of such a method can include one or more of the following features. Generating the synthetic content includes generating the synthetic content to comprise content associated with content accessed by the unauthorized party on the server. Generating the synthetic content includes identifying sensitive content accessed by the unauthorized party on the server before unauthorized access was identified, and generating synthetic content comprising information contradictory to the content on the server accessed by the unauthorized party. Generating the synthetic content includes generating the synthetic content to comprise content publicly available from the server. Generating the synthetic content includes monitoring publicly available content associated with the server, and generating synthetic content comprising the publicly available content associated with the server that contains no sensitive information or fake sensitive information. Configuring the security system to permit the unauthorized party to access the synthetic content responsive to the unauthorized party's interactions with the security system includes making the synthetic content comprising the contradictory information accessible responsive to the unauthorized party accessing information associated with the sensitive information; and making the synthetic content comprising the publicly available content accessible responsive to the unauthorized party accessing information not related to sensitive information. Periodically crawling through publicly available content associated with the server, and updating the synthetic content based on the publicly available content. Generating synthetic content accessible to an unauthorized party associated with the duplicated user session includes analyzing unauthorized party activity in the computing environment configured to simulate the server to determine which content the unauthorized party is attempting to access and the methods the unauthorized party the content, granting access to the synthetic content responsive to a first set of one or more actions performed by the unauthorized party, denying access to the synthetic content responsive to a second set of one or more actions performed by the unauthorized party to encourage unauthorized party engagement with the synthetic content. Receiving state information for a user session from a network device associated with the server responsive to the second security device detecting unauthorized activity associated with the user session, establishing a duplicate user session on the security system, and routing network traffic associated with the user session to the duplicate user session at the security system. Analyzing activities of the unauthorized party with the duplicate user session to identify one or more types of attack, generating configuration information for the network device based on the one or more types of attempted attack on the server, and sending a configuration message to the network device to change one or more configuration settings based on the configuration information. The configuration information comprises at least one of a rule for determining whether to block a particular activity performed by a user and a signature for identifying that an attack on the server is being undertaken.

An example security system according to the disclosure includes means for monitoring interactions of an unauthorized party with a computing environment configured to simulate a server, means for generating synthetic content based on the unauthorized party's interactions with the computing environment, and means for configuring the security system to permit the unauthorized party to access the synthetic content responsive to the unauthorized party's interactions with the security system.

Implementations of such a security system can include one or more of the following features. The means for generating the synthetic content includes means for generating the synthetic content to comprise content associated with content accessed by the unauthorized party on the server. The means for generating the synthetic content includes means for identifying sensitive content accessed by the unauthorized party on the server before unauthorized access was identified, and means for generating synthetic content comprising information contradictory to the content accessed by the unauthorized party on the server. The means for generating the synthetic content includes means for generating the synthetic content to comprise content publicly available from the server. The means for generating the synthetic content includes means for monitoring publicly available content associated with the server, and means for generating synthetic content comprising the publicly available content associated with the server that contains no sensitive information or fake sensitive information. The means for configuring the security system to permit the unauthorized party to access the synthetic content responsive to the unauthorized party's interactions with the security system includes means for making the synthetic content comprising the contradictory information accessible responsive to the unauthorized party accessing information associated with the sensitive information, and means for making the synthetic content comprising the publicly available content accessible responsive to the unauthorized party accessing information not related to sensitive information.

An example security system according to the disclosure includes a memory and a processor communicatively coupled to the memory. The processor is configured to monitor interactions of an unauthorized party with a computing environment configured to simulate a server, generate synthetic content based on the unauthorized party's interactions with the computing environment, and configure the security system to permit the unauthorized party to access the synthetic content responsive to the unauthorized party's interactions with the security system.

Implementations of such a security system can include one or more of the following features. The processor is further configured to generate the synthetic content to comprise content associated with content accessed by the unauthorized party on the server. The processor being configured to generate the synthetic content is further configured to identify sensitive content accessed by the unauthorized party on the server before unauthorized access was identified, and generate synthetic content comprising information contradictory to the content accessed by the unauthorized party on the server. The processor being configured to generate the synthetic content is further configured to generate the synthetic content to comprise content publicly available from the server. The processor being configured to generate the synthetic content is further configured to monitor publicly available content associated with the server, and generate synthetic content comprising the publicly available content associated with the server that contains no sensitive information or fake sensitive information. The processor being configured to configure the security system to permit the unauthorized party to access the synthetic content responsive to the unauthorized party's interactions with the security system is further configured to make the synthetic content comprising the contradictory information accessible responsive to the unauthorized party accessing information associated with the sensitive information, and make the synthetic content comprising the publicly available content accessible responsive to the unauthorized party accessing information not related to sensitive information. The processor is further configured to periodically crawl through publicly available content associated with the server, and update the synthetic content based on the publicly available content.

An example non-transitory, computer-readable medium, according to the disclosure has stored thereon computer-readable instructions operating a security system for protecting a server. The instructions include instructions configured to cause the security system to monitor interactions of an unauthorized party with a computing environment configured to simulate the server, generate synthetic content based on the unauthorized party's interactions with the computing environment, and configure the security system to permit the unauthorized party to access the synthetic content responsive to the unauthorized party's interactions with the security system.

Implementations of such a non-transitory, computer-readable medium can include one or more of the following features. The instructions configured to cause the security system to generate the synthetic content include instructions configured to cause the security system to generate the synthetic content to comprise content associated with content accessed by the unauthorized party on the server. The instructions configured to cause the security system to generate the synthetic content include instructions configured to cause the security system to identify sensitive content accessed by the unauthorized party on the server before unauthorized access was identified, and generate synthetic content comprising information contradictory to the content accessed by the unauthorized party on the server. The instructions configured to cause the security system to generate the synthetic content include instructions configured to cause the security system to generate the synthetic content to comprise content publicly available from the server. The instructions configured to cause the security system to generate the synthetic content further comprise instructions configured to cause the security system to monitor publicly available content associated with the server; and generate synthetic content comprising the publicly available content associated with the server that contains no sensitive information or fake sensitive information. The instructions configured to cause the security system to configure the security system to permit the unauthorized party to access the synthetic content responsive to the unauthorized party's interactions with the security system further comprise instructions configured to cause the security system to make the synthetic content comprising the contradictory information accessible responsive to the unauthorized party accessing information associated with the sensitive information, and make the synthetic content comprising the publicly available content accessible responsive to the unauthorized party accessing information not related to sensitive information.

BRIEF DESCRIPTION OF THE DRAWINGS

FIG. 4 is a flow diagram of a process for operating a security system for protecting a server according to the techniques discussed herein.

FIG. 5 is a flow diagram of an example process generating synthetic content according to the techniques discussed herein.

FIG. 6 is a flow diagram of an example process for generating synthetic content according to the techniques discussed herein.

FIG. 7 is a flow diagram of an example process for generating synthetic content according to the techniques discussed herein.

FIG. 10 is a flow diagram of an example process for generating synthetic content according to the techniques discussed herein.

FIG. 11 is a flow diagram of an example process for protecting a server according to the techniques discussed herein.

DETAILED DESCRIPTION

Techniques are disclosed herein for using a honeypot or a honey farm to protect a server. The server can be a content provider that provides access to one or more networked computing services via the Internet and/or other public and/or private network connections. A network security device, such as a web application firewall or other such device, can be configured to protect the server by detecting unauthorized activity on the server and to perform one or more actions in response to detecting such unauthorized activity. The network security device can be configured to provide information to a security system that includes one or more honeypots. The security system can use the information provided to initialize a duplicate user session in a honeypot of the security system that provides a simulated computing environment that mimics the computing environment of the server. The network device can then route network traffic from the unauthorized user to the security system, which can in turn route this traffic to the simulated computing environment. The security system can be configured to provide synthetic content for the simulated computing environment that contains no sensitive information or fake sensitive information, but appears to include content of the type that would have been available on the server. The synthetic content can be generated sanitizing sensitive information maintained by the server and/or from publicly available content provided by the server and/or other sources of publicly available content. The following examples illustrate these concepts.

Figure 1:
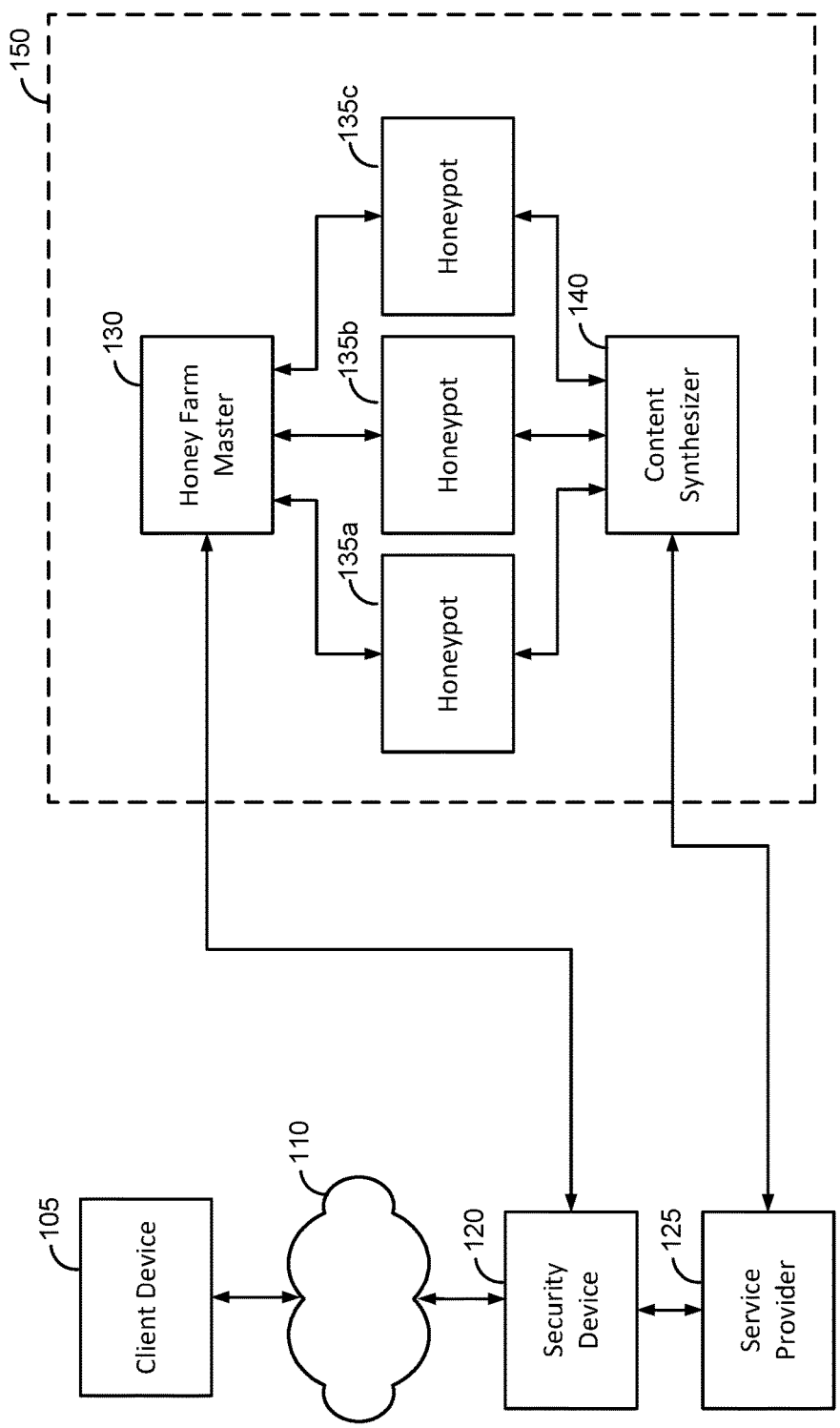
FIG. 1 is a block diagram of an example network environment, which may be suitable for implementing the techniques discussed herein.

FIG. 1 is a block diagram of an example network environment, which may be suitable for implementing the techniques discussed herein. The particular configuration illustrated herein is merely an example of one configuration of a network environment in which the techniques disclosed herein may be used. Furthermore, an implementation of such a network environment may include additional elements that are not illustrated herein and have been omitted for the sake of clarity.

The network environment can include a client device 105, a network 110, a security device 120, a service provider 125, and a security system 150. The security system 150 includes a honey farm master 130, a plurality of honeypots (this example implementation includes honeypot 135a, honeypot 135b, and honeypot 135c), and a content synthesizer 140. Other implementations of the security system 150 can include a different configuration. For example, the security system may include a single honeypot rather than the honey farm and the functions of the content synthesizer may be integrated into the honeypot 135. Other configurations of the security system 150 are also possible that include additional components or omit components illustrated herein, but are configured to perform the logical functions of the security system described herein.

The client device 105 can comprise a computing device configured to communicate via the network 110 with other networked entities via a wired and/or wireless connection. The client device 105 can be a desktop computer, a laptop computer, a tablet computer, a smartphone, or other computing device. The client device 105 can be used to access information provided by the service provider 125 and may be used by an authorized user of services provided by the service provider 125. The client device 105 may also be used to by an unauthorized user of the services and/or information provided by the service provider 125. For example, the client device 105 may be used by an unauthorized party to attack the service provider 125 in or order to obtain sensitive information stored thereon or to conduct a denial of service (DOS) attack.

The network 110 can comprise one or more wired and/or wired network connections between the client device 105 and the security device 120. The network 110 can comprise a network interconnected networks, and may be the interconnected network of networks referred to as the Internet.

The service provider 125 can provide computer-based services to authorized users. The service provider 125 can be implemented by one or more computing devices. The service provider 125 can be configured to provide publicly available information that is accessible to any user accessing the service provider 125. For example, the service provider 125 can be configured to provide a website that provides publicly available information about a business or company associated with the service provider 125 or that contracts with the service provider 125 to provide information or services on the behalf of the business or company. The service provider 125 can also be configured to provide information about one or more web applications that are supported by the service provider 125. For example, the service provider 125 can be configured to provide one or more web applications related to financial services, data management services, electronic commerce, government services, and/or other web-based applications. The service provider 125 can be configured such that the web applications, the data generated therefrom, or both have limited access. Authorized users of the web applications can be required to provide authentication credentials, such as a login and password and/or an authentication token to access the web application and/or other non-publicly available content.

The security device 120 can be disposed between the network 110 and the service provider 125. The security device 120 can be a web application firewall, or other such device for securing the service provider 125 and/or other computing devices. The security device 120 can be configured to monitor and control incoming and outgoing network traffic for the service provider 125. The security device 120 can be configured to monitor and control incoming and outgoing traffic for just the service provider 125 or may be configured to monitor and control incoming and outgoing network traffic for a network (not shown) on which the service provider 125 may be disposed. In this latter configuration, the network may include more than one networked device for which the security device 120 is configured to monitor and control incoming and outgoing network traffic. The security device 120 can be configured to monitor the incoming the incoming and outgoing activity to detect unauthorized activity on the server. The unauthorized activity can be activities indicative of an attack on the service provider 125 which may be conducted to gain access to sensitive information stored therein, to assume control of one or more aspects of the service provider 125, or a combination thereof. For example, the security device 120 can be configured to detect SQL injection attacks and other such attacks on the service provider 125. The security device 120 can also be configured to detect other types of events that indicate that an unauthorized user is attempting to gain access to sensitive data and/or assume control of the service provider 125. The security device 120 may be configured to require multiple attempts at such activities before making a determination that an attack is underway to and take action.

In response to detecting unauthorized activity, the security device 120 can be configured to alert the security system 150 that an unauthorized access has been detected. The security device 120 can be configured to forward state information for a user session between the client device 105 and the service provider 125 in which activity by the unauthorized user was detected. The security device 120 can also be configured to route network traffic received from the client device 105 to the security system 150. The security system 150 can be communicatively coupled to the security device 120 via a network connection. The network connection can be a network that is behind the secure perimeter provided by the security device 120 (the side of the perimeter on which the service provider 125 is located). The network connection between the security system 150 and the security device 120 can also be over the network 110, which may comprise one or more public and/or private networks.

The security system 150 can be configured to provide a computing environment that simulates the computing environment of the service provider 125. The security system 150 can be configured to receive the state information for the user session and to establish a duplicate user session on the security system 150. The network traffic from the client device 105 associated with the user session can be rerouted by the security device 120 to the security system 150. The duplicate user session appears to the unauthorized user as if the unauthorized user is still interacting with the service provider 125 rather than the security system 150. The security system 150 can be configured to generate synthetic content that can include publicly available information and/or information that is contradictory to sensitive information that is included on the service provider 125. The security system 150 can be configured to monitor the interactions of the unauthorized party with the computing environment provided by the security system 150, and can be configured to generate synthetic content based on the unauthorized party's interactions with the computing environment. The synthetic content can be made accessible to the unauthorized party to distract the unauthorized party, to confuse the unauthorized party by including information contradictory to sensitive information included on the service provider 125 that was accessed by the unauthorized party before the unauthorized access was detected, and to keep the unauthorized party engaged with the security system 150 to determine what types of the information that the unauthorized party is interested in obtaining from the service provider 125 and the techniques used to obtain such information. The security system 150 can be configured with information regarding the types of attacks that an unauthorized user may make against the service provider 125 and can be configured such that a set of one or more types of attacks will appear to be successful against the security system 150 while one or more other types of attacks will appear to be unsuccessful against the security system 150. If all types of attacks were made to appear successful by the security system 150, the unauthorized user may become suspicious that the attack has been detected and the unauthorized user is now engaging with a honeypot or other diversionary tactic designed to protect the service provider 125. However, the security system 150 is able to keep the unauthorized user engaged with the security system 150 by mimicking a real-world situation where some attacks against a computer system may be successful and others may fail. The unauthorized user has to work for the synthetic content, and the attack does not appear to be too easy. The security system 150 can be configured to analyze the activities of the unauthorized user to identify one or more types of attack attempted by the unauthorized user. The security system 150 can be configured to generate configuration information for the security device 120 based on the types of attacks attempted by the unauthorized user, and to send a configuration message to the security device 120 that includes the configuration information. The security device 120 can use the configuration information to configure the aspects of the security device 120 to prevent future attacks of the same sort that the unauthorized user attempted while interacting with the simulated environment provided by the security system 150.

In one aspect, the security system 150 can implement a honey farm that includes one or more honeypots that are configured to provide a simulated computing environment that mimics the computing environment of the service provider 125. This simulated computing environment can be used to simulate interactions with what appears to be a real computing environment so the unauthorized user should be unaware that they have been handed off to and are now interacting with a duplicate user session established in the simulated computing environment of the security system 150.

The security system 150 can be configured to initialize a duplicate user session in a honeypot of the security system 150 based on the user session information provided by the security device 120. The honey farm in the example illustrated in FIG. 1 includes three honeypots: honeypot 135a, 135b, and 135c. Other implementations can include a different number of honeypots. The security system can also include a content synthesizer 140 that is configured to generate synthesized content for the honeypots. The honey farm master 130 can be configured to monitor the activity on the individual honeypots, to perform load balancing on the honeypots, and to receive notifications of unauthorized behavior on the service provider 125. The honey farm master 130 can be configured to select a honeypot that will be used to create a duplicate of the computing environment of the service provider 125 and to establish the duplicate user session for the unauthorized user that mirrors that of the user session of the unauthorized user at the service provider 125.

The content synthesizer 140 can be configured to generate synthetic content that an unauthorized party can access. The synthetic content can be used engage the attention of an attacker and to keep the attacker engaged with the simulated computing environment provided by duplicate user session initialized by the security system 150 in one of the honeypots. The synthetic content can include static content, dynamically generated content, or a combination thereof. The static content can be generated in advance based on publically available information provided by the service provider 125, content from other sources, or a combination thereof. The publically available information does not include any sensitive information that may be maintained by the service provider 125. The dynamic content can be generated by the content synthesizer by monitoring the interactions of the unauthorized party with the service provider 125 before being handed off to the security system 150, the interactions of the unauthorized party with the security system 150 after being handed off to the security system 150, or both.

The content synthesizer 140 can be configured to generate content that does not include any sensitive data and that can be customized based on the unauthorized party's interactions with the service provider 125 and/or the security system 150. The synthetic content comprises information that appears to be sensitive, such as user data, financial data, medical data, payment account data, purchase history data, and/or other types of sensitive information that may associated with the content and/or services provided by the service provider 125. The content synthesizer 140 can be configured to generate the synthetic content from publicly available, non-sensitive content provided by the service provider 125 or from other publicly available sources. The content synthesizer 140 can also be configured to generate synthetic content from sensitive information sources that have been sanitized to remove sensitive information, such as a database of financial, medical, or other sensitive information. The information in the database can be modified to remove sensitive information, such as payment account information, medical records, and/or other such sensitive information and replaced with information that is formatted and appears to be valid sensitive information but contains no actual sensitive information. The content synthesizer 140 can be configured to generate at least a portion of the synthetic content in advance of detecting unauthorized activity on the service provider 125 so that at least some synthetic content can be provided to the honeypot 135 which will be configured to support the duplicate user session to which the unauthorized party is redirected upon detection of the attack. Content aggregation and synthesis can be configured to run periodically throughout the day or may be configured to run at specific day and/or times. The content synthesizer 140 can also be configured to generate at least a portion of the synthetic content on demand based on the observed interactions of the unauthorized party with the service provider 125 and the duplicate user session provided by the honeypot 135 of the security system 150. The type of content accessed in the simulated computing environment of the honeypot, the keywords or phrases used in searches through the files system, documents, databases, and/or other synthetic content of the simulated computing environment can also be used to determine what synthetic content should be generated. Synthetic content related to these words and/or phrases can be generated from content The example computing environment illustrated in FIG. 1 is merely an example of one possible configuration of a computing environment in which the techniques disclosed herein may be implemented. Other configurations may include additional elements not illustrated in FIG. 1 and the various components may be interconnected in a different configuration than what is shown in FIG. 1.

Figure 2:
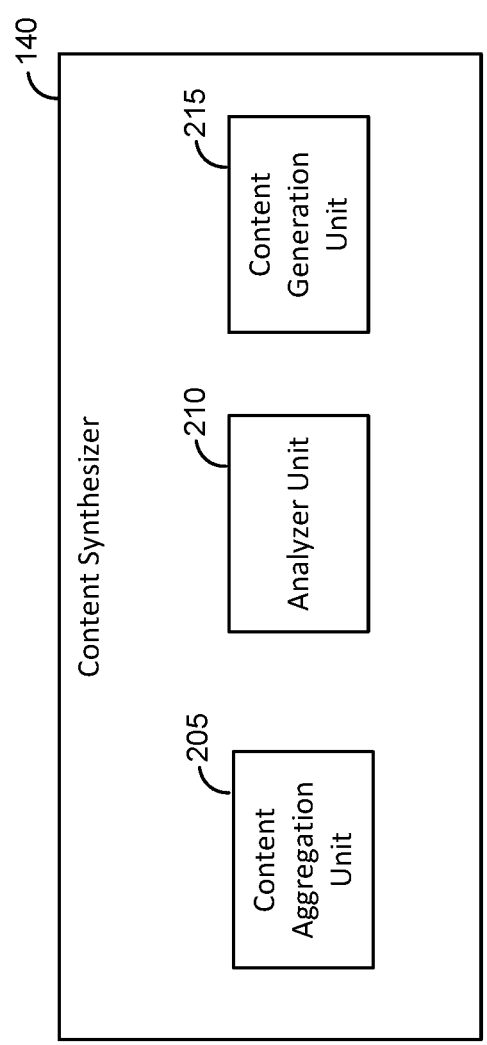
FIG. 2 is a block diagram of an example content synthesizer that can be used to implement the content synthesizer illustrated in FIG. 1 according to the techniques discussed herein.

FIG. 2 is a block diagram of an example content synthesizer that can be used to implement the content synthesizer 140 illustrated in FIG. 1. The content synthesizer 140 can include a content aggregation unit 205, an analyzer unit 210, and a content generation unit 215. The content synthesizer 140 can include additional components in addition to or in instead of the content aggregation unit 205, the analyzer unit 210, and the content generation unit 215. The content aggregation unit 205, the analyzer unit 210, and the content generation unit 215 can be implemented as software, hardware, or a combination thereof. The content synthesizer 140 can be implemented as one or more application specific integrated circuits (ASICs), programmable logic devices (PLDs), field programmable gate arrays (FPGAs), or other electronic units designed to perform the functions described herein, or a combination thereof. The content synthesizer 140 can also be implemented as a combination of hardware and software components. The example configuration of the content synthesizer 140 can illustrated in FIG. 2 illustrates one possible configuration of the functional components of the content synthesizer. Other implementations can include a different configuration of functional units than that discussed herein that perform the functions of the content synthesizer 140.

The content aggregation unit 205 can be configured to aggregate and sanitize information that that be used to generate synthetic content to be made available to an unauthorized user via a honeypot 135 of the security system 150. The content aggregation unit 205 can be configured to access public facing content associated with the service provider 125, such as web page content, blogs, discussion forums, newsgroups, and/or social media content. The content aggregation unit 205 can be configured to provide a user interface through which an administrator can specify which content associated with the service provider 125 should be collected by the content aggregation unit 205. The content aggregation unit 205 can be configured to automatically collect information by periodically crawling a list of web pages, blogs, discussion forums, newsgroups, and/or social media sites to collect information. The content aggregation unit 205 can be configured to crawl each site at a specified frequency. The content aggregation unit 205 can be configured to allow the administrator to schedule the collection of content from each source to occur on particular days and/or times. The content aggregation unit 205 can be configured to reformat the content found at the sites visited into other formats that can be included in synthetic content. For example, the content aggregation unit 205 can be configured to reformat content obtained from a web page or other site into a document that can be stored in a duplicate user environment instantiated in a honeypot and stored in a database or file system where the document can be "discovered" by an unauthorized user.

The analyzer unit 210 can be configured to analyze the content collected by the content aggregation unit 205 and to build one or more models of the information collected. The analyzer unit 210 can be configured to build a statistical language model for textual content collected by the content aggregation unit 205, such as documents, web content including but not limited to web page content, blogs, discussion forums, newsgroups, and social media content, and program code or executable scripts. The analyzer unit 210 can be configured to generate the statistical language model by determining a probability distribution of words or sequences of words included in the textual content. The probability distribution represents the relative likelihood that these words or sequences of words appear in such content in the future. The content generation unit 215 can be configured to make use of this model when generating synthetic content to generate content that includes a similar distribution of these words or sequences of words so that the synthetic content appears to be genuine. The statistical language model can be based on n-grams, which are a contiguous sequence of n items from a given sequence of textual content. The items can comprise phonemes, syllables, letters, words or other segments of textual content.

The analyzer unit 210 can be configured to build a statistical model or models for other types of information, such as financial data, user data, financial data, medical data, payment account data, purchase history data, and/or other types of sensitive information that may associated with the content and/or services provided by the service provider 125. The content aggregation unit 205 and/or the analyzer unit 210 can be configured to obtain the information for the model from real information maintained by the service provider 125. The analyzer unit 210 can be configured to anonymize the data to remove sensitive information and can also be configured to insert contradictory information into the one or models to contradict sensitive information that had been accessed or potentially accessed on the service provider 125 by the unauthorized party prior to the unauthorized activity being detected by the security device.

The content aggregation unit 205 can also be configured to collect multimedia content, such as audio, video, and images. The multimedia content can be included in the synthesized content provided by the content generation unit 215. The content aggregation unit 205 can also be configured to extract information from the multimedia content using object recognition, text recognition, speech recognition, and/or other processing techniques to extract information from the multimedia content. The content aggregation unit 205 can also be configured to identify keywords and/or phrases included in the aggregated content, to search for related, publicly-available electronic content by searching the Internet and/or other sources of electronic content, and collect content related to the keywords and/or phrases that can be used to generate synthetic content that does not contain any sensitive information.

The content generation unit 215 can also be configured to build a model from a database or other content comprising sensitive information utilized by the service provider 125. The content generation unit 215 can be configured to sanitize the data to ensure that no sensitive information or fake sensitive information is included in the synthetic content. The fake sensitive information can include information that appears to be sensitive information, but actually comprises no non-publically available information. The fake sensitive information can be algorithmically generated to appear to be sensitive information. The content generation unit 215 can be configured to remove sensitive information, encrypt or otherwise obfuscate the sensitive information, or to replace the sensitive information with randomly generated content or algorithmically generated fake sensitive information. The randomly generated or algorithmically generated content can be content that is formatted to appear to be real content. For example, financial content can be replaced with randomly generated content formatted to appear to be an appropriate format for the currency utilized in the financial content. Other types of sensitive data can also be replaced with randomly generated or algorithmically generated data formatted to appear to be genuine data.

The content generation unit 215 can also be configured to build a model based on behavior patterns of authorized users of the service provider 125. The content generation unit 215 can be configured to obtain usage information for authorized users from the service provider 125 and/or be configured to observe the usage of the authorized users of the service provider 125 and to generate the usage information. The content generation unit 215 can be configured to use this usage information to generate user data and other content that appears to have been generated by a real user authorized user of the service provider 125, but the content can be randomly generated based on the usage information obtained from the service provider 125 or observed by the content generation unit 215 such that the synthetic content appears to have been generated by a real authorized user of the service provider 125. The authorized users for which the usage information may be generated may be administrators of one or more components of the service provider 125 or may be end users of information or a service provided by the service provider 125.

The content generation unit 215 can be configured to generate synthetic content. The content generation unit 215 can be configured to generate at least a portion of the synthetic content and to store the synthetic content in a computer-readable memory associated with the security system 150. The content generation unit 215 can be configured to provide the synthetic content to a honeypot 135 of the security system 150 in response to an the security device 120 detecting unauthorized activity on the service provider 125 and a duplicate user session being established on the honeypot 135 by the security system 150. The content generation unit 215 can also be configured to monitor the unauthorized user's interactions with the simulated computing environment established at the honeypot, and to dynamically generate synthetic content based on those actions. The content generation unit 215 can also be configured to grant or deny access to synthetic content based on the unauthorized user's interactions with the simulated computing environment to help keep the unauthorized user engaged with the simulated environment by making some attacks appear to be successful while other appear to fail much like what would occur in a real computing environment.

Figure 3:
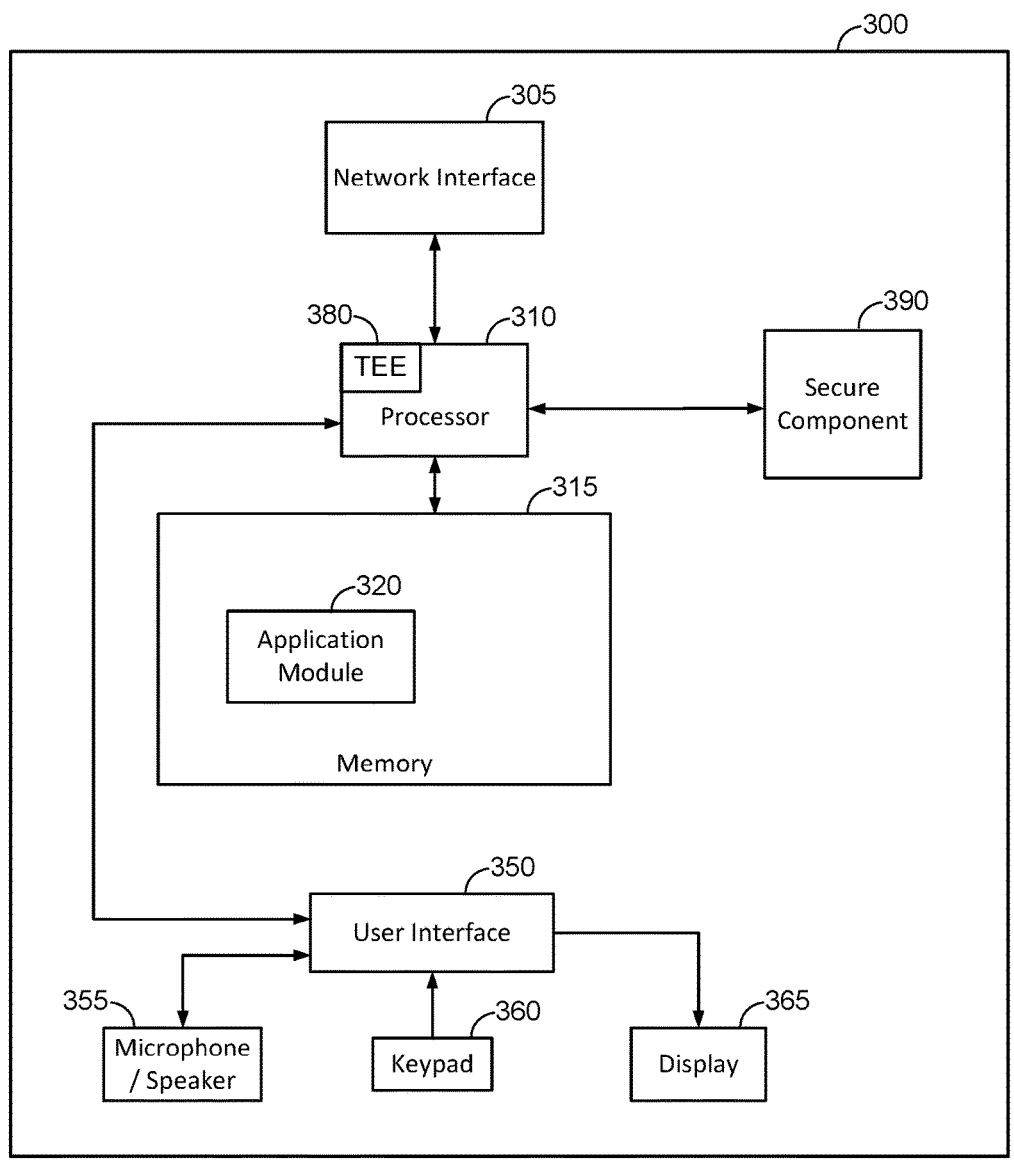
FIG. 3 is a functional block diagram of computing device that can be used to implement the network device, one or more components of the security system, and/or the service provider illustrated in FIG. 1.

FIG. 3 is a block diagram of an example device that can be used to implement the security device 120, the service provider 125, and/or one or more components of the security system 150 illustrated in FIG. 1. The computing device can be used to implement, at least in part, the processes illustrated in FIG. 4-14. FIG. 3 is a schematic diagram illustrating various components of an example computing device 300. For the sake of simplicity, the various features/components/functions illustrated in the schematic boxes of FIG. 3 are connected together using a common bus to represent that these various features/components/functions are operatively coupled together. Other connections, mechanisms, features, functions, or the like, can be provided and adapted as necessary to operatively couple and configure a portable wireless device. Furthermore, one or more of the features or functions illustrated in the example of FIG. 3 can be further subdivided, or two or more of the features or functions illustrated in FIG. 3 can be combined. Additionally, one or more of the features or functions illustrated in FIG. 3 can be excluded.

As shown, the computing device 300 can include a network interface 305 that can be configured to provide wired and/or wireless network connectivity to the computing device 300. The network interface can include one or more local area network transceivers that can be connected to one or more antennas. The one or more local area network transceivers comprise suitable devices, circuits, hardware, and/or software for communicating with and/or detecting signals to/from one or more of the WLAN access points, and/or directly with other wireless devices within a network. The network interface 305 can also include, in some implementations, one or more wide area network transceiver(s) that can be connected to the one or more antennas. The wide area network transceiver can comprise suitable devices, circuits, hardware, and/or software for communicating with and/or detecting signals from one or more of, for example, the WWAN access points and/or directly with other wireless devices within a network.

The processor(s) (also referred to as a controller) 310 can be connected to the network interface and/or other components of the computing device 300. The processor can include one or more microprocessors, microcontrollers, and/or digital signal processors that provide processing functions, as well as other calculation and control functionality. The processor 310 can be coupled to storage media (e.g., memory) 315 for storing data and software instructions for executing programmed functionality within the mobile device. The memory 315 can be on-board the processor 310 (e.g., within the same IC package), and/or the memory can be external memory to the processor and functionally coupled over a data bus.

A number of software modules and data tables can reside in memory 315 and can be utilized by the processor 310 in order to manage both communications with remote devices/nodes, and/or perform the various security processes disclosed herein. As illustrated in FIG. 3, in some embodiments, the memory 315 can include an application module 320 which can implement one or more applications. It is to be noted that the functionality of the modules and/or data structures can be combined, separated, and/or be structured in different ways depending upon the implementation of the computing device 300.

The application module 320 can be a process running on the processor 310 of the computing device 300, which can request information from the application module 320 or other data from one of the other modules of the computing device 300. Applications typically run within an upper layer of the software architectures and can be implemented in a rich execution environment of the computing device 300. The application module 320 can be configured to perform one or more of the security processes disclosed herein.

The processor 310 can include a trusted execution environment 380 and/or the computing device 300 may include a secure component 390. The trusted execution environment 380 and/or the secure component 390 can be used to implement a secure processing environment for storing sensitive data and for performing processes that need to remain secure, such as the processes disclosed herein for protecting a server, for generating a simulated computing environment and for generating synthetic content to engage with an unauthorized party accessing content of the service provider 125. The trusted execution environment 380 and/or the secure component 390 can be used to provide a secure computing environment for implementing the security processes disclosed herein that can prevent the unauthorized party from tampering with and/or potentially disabling the security processes disclosed herein.

The trusted execution environment 380 can be implemented as a secure area of the processor 310 that can be used to process and store sensitive data. The trusted execution environment 380 can be configured to execute trusted applications that provide end-to-end security for sensitive data by enforcing confidentiality, integrity, and protection of the sensitive data stored therein. The trusted execution environment 380 can be used to store encryption keys, secure application program code, and/or other sensitive information.

The computing device 300 can include a secure component 390 (also referred to herein as a trusted component). The computing device can include the secure component 390 in addition to or instead of the trusted execution environment 380. The secure component 390 can comprise autonomous and tamper-resistant hardware that can be used to execute secure applications and/or processes. The secure component 390 can be used to implement the processes for mitigating attacks on the baseband process disclosed herein and may implement these processes in combination with the trusted execution environment 380. The secure component 390 can be configured to store sensitive data and to provide confidentiality, integrity, and protection to the data stored therein. The secure component 390 can be used to store encryption keys, user data, and/or other sensitive data. The secure component 390 can be integrated with the hardware of the computing device in a permanent or semi-permanent fashion can be used to securely store data and/or provide a secure execution environment for applications.

The computing device 300 can further include a user interface 350 providing suitable interface systems, such as a microphone/speaker 355, a keypad 360, and a display 365 that allows user interaction with the computing device 300. The microphone/speaker 355 (which can be the same or different from the audio sensor) provides for voice communication services (e.g., using the wide area network transceiver(s) 330 and/or the local area network transceiver(s) 335). The keypad 360 can comprise suitable buttons for user input. The display 365 can include a suitable display, such as, for example, a backlit LCD display, and can further include a touch screen display for additional user input modes.

FIG. 4 is a flow diagram of a process for operating a security system for protecting a server according to the techniques discussed herein. The process illustrated in FIG. 4 can be implemented using the security system illustrated in FIGS. 1 and 2, unless otherwise specified. The content synthesizer 140 of the security system 150 can provide means for performing the various stages of the process illustrated in FIG. 4 unless otherwise specified.

Interactions of an unauthorized party with a computing environment configured to simulate a server can be monitored (stage 405). The server can be the service provider 125, which can comprise one or more servers. The security device 120 can be configured to detect unauthorized activity on the service provider 125 and to notify the security system 150 of the unauthorized activity. The security device 120 and/or the service provider 125 can be configured to send state information for a user session associated with the unauthorized user at the service provider 125 to the security system 150 responsive to the security device 120 detecting the unauthorized activity. The honey farm master 130 can be configured to receive the state information, to select a honeypot from the honeypots maintained by the security system 150, and to instantiate a duplicate user session based on the state information received from the security device 120. Network traffic to the service provider 125 associated with the unauthorized activity can be routed to the security system 150 by the security device 120. The duplicate user session on the honeypot can be configured to appear to the unauthorized user to be the original user session with the service provider 125. The security device 120 can be configured to route traffic received from the network 110 to the security system 150 so that the unauthorized user is not alerted that they are now interacting with the security system 150 instead of the service provider 125. The content synthesizer 140 of the security system 150 can continue to monitor the interactions of the unauthorized party with the duplicate user environment established by the security system 150 on one of the honeypots. The content synthesizer 140 can monitor the unauthorized party's interactions with the computing environment to capture information about the types of attacks that the unauthorized user attempts to execute and the information that the unauthorized user attempts to access.

Synthetic content based on the unauthorized party's interactions with the computing environment can be generated (stage 410). The content synthesizer 140 of the security system 150 can be configured to generate synthetic content as discussed above with respect to FIGS. 1 and 2. The content synthesizer 140 can be configured to generate the synthetic content from publicly available content on the service provider 125 and/or from other sources of public information. The content synthesizer 140 can also be configured to generate the synthetic content from sanitized sensitive content obtained from the service provider 125. The content synthesizer 140 can also be configured to monitor the unauthorized party's interactions with the duplicate user session established in the honeypot 135 of the security system 150 and to obtain information from the service provider 125 indicative of the information that may have been accessed by the unauthorized party on the service provider 125 before the security device 120 detected the unauthorized activity. The synthetic content can be tailored to the types of information that the unauthorized party appears to be interested in based on their interactions with the duplicate user session and what may have been accessed on the service provider 125. Tailoring the synthetic content to the unauthorized user can help to increase the unauthorized party's engagement with the security system 150, which in turn can allowed the security system 150 to collect more information about the types of information that the unauthorized party appears to be interested in and the types of attacks that the unauthorized party has executed on in the simulated environment provided by the security system 150. The content synthesizer 140 can be configured to generate at least a portion of the synthetic content in advance as discussed above, but can also be configured to generate at least a portion of the synthetic content as the unauthorized party interacts with the duplicate user environment initialized on the honeypot 135. For example, the content synthesizer 140 can be configured to generate content based on keywords or phrases associated content accessed by the unauthorized party or included in database queries or other searches for content conducted by the unauthorized party.

The security system can be configured permit the unauthorized party to access synthetic content responsive to the unauthorized party's interactions with the security system (stage 415). The content synthesizer 140 can be configured to configured to store the synthetic content into the honeypot 135 in which the duplicate user session is being hosted. The content synthesizer 140 can be configured to place the content into a database or in one or more files stored in a file system of the honeypot 135 where the unauthorized user can access the synthetic content through the unauthorized user's actions as if the duplicate user environment created by the honeypot 135 were the actual computing environment of the service provider 125. The configuration of the honeypot should appear to the unauthorized party as identical to that of the service provider 125. The content synthesizer 140 can be configured to analyze the activity of the unauthorized party in the computing environment provided by the honeypot 135 and to grant access to synthetic content responsive to some actions performed by the unauthorized party and to deny access to synthetic content responsive to other actions performed by the unauthorized party. The content synthesizer 140 can determine whether to grant or deny access in response to certain actions to add a degree of challenge or difficulty to obtaining the synthetic content, which can help to engage the attention of the unauthorized party and can help to establish the illusion that the duplicate user environment is a real computing environment in which some types of attack may work while others are not. The longer that the unauthorized party remains engaged with the duplicate user environment provided by the security system 150, the more that can be learned about the types of attacks that the unauthorized party may attempt to use in the future against the service provider 125 or other computer systems. Furthermore, keeping the unauthorized party engaged with the simulated computing environment provided by the security system 150 for a long as possible diverts the attention of the unauthorized party away from the service provider 125 and other similar computer systems.

FIG. 5 is a flow diagram of an example process generating synthetic content according to the techniques discussed herein. The process illustrated in FIG. 4 can be implemented using the security system illustrated in FIGS. 1 and 2, unless otherwise specified. The content synthesizer 140 of the security system 150 can provide means for performing the various stages of the process illustrated in FIG. 5 unless otherwise specified. The process illustrated in FIG. 5 can be used to implement, at least in part, stage 405 and stage 410 of the process illustrated in FIG. 4.

Access to content on the server can by the unauthorized party can be identified (stage 505). The security device 120 can be configured to determine that the unauthorized party has accessed content on the service provider 125. The security device 120 can be configured to monitor network traffic to and from the service provider 125 to perform intrusion detection analysis on the network traffic to determine whether an unauthorized access to content of the service provider 125 has occurred. The security device 120 can be configured to compare the network traffic to signatures of known exploits or attacks or to apply rules to the network traffic to identify unauthorized activity.

The content accessed on the server prior to the unauthorized access can be identified (stage 510). The security device 120 can be configured notify the security system 150 of the unauthorized access, as discussed above, and the security system 150 can be configured to set up a duplicate user session in a honeypot 135 of the security system 150 and redirect the unauthorized user to the duplicate user session. The security device 120 can be configured to identify data that was or may have been accessed on the service provider 125 before the unauthorized access was identified and the handoff to the security system 150 occurred. For example, the security device 120 can be configured to identify records of one or more databases that include sensitive information, such as financial data or medial data, that were accessed by the unauthorized user before the unauthorized access was detected. The security device 120 can also be configured to identify other content, such as program code, configuration files, or other documents stored by the service provider 125 that may have been accessed by the unauthorized user. The security device 120 can be configured to identify the information that was or may have been accessed to the security system 150 via one or more messages.

Synthetic content that includes information contradictory to the content on the server accessed by the unauthorized party can be generated (stage 515). The security system 150 can be configured to provide the information regarding the information that was or may have been accessed to the content synthesizer 140. The content synthesizer 140 can be configured to generate synthetic content that includes contradictory information, such as fake account numbers, fake financial data, fake user identification data, and/or other information that contradicts the sensitive information that was or may have been accessed by the unauthorized party on the service provider 125. The contradictory information can be added to the one or more databases, documents, executable scripts, documents and/or other repositories of information included in the duplicate computing environment simulated by the security system 150.

FIG. 6 is a flow diagram of an example process for generating synthetic content according to the techniques discussed herein. The process illustrated in FIG. 4 can be implemented using the security system illustrated in FIGS. 1 and 2, unless otherwise specified. The content synthesizer 140 of the security system 150 can provide means for performing the various stages of the process illustrated in FIG. 6 unless otherwise specified. The process illustrated in FIG. 6 can be used to implement, at least in part, stage 410 of the process illustrated in FIG. 4.

Publicly available content associated with the server can be monitored (stage 605). As discussed above, the content aggregation unit 205 of the content synthesizer 140 can be configured to monitor publicly available content of the service provider 125 and to identify any new content that has been added to the publicly available content. The content aggregation unit 205 can also be configured to conduct searches for related publicly available content from other sources, such as web pages, blogs, discussion forums, newsgroups, and/or social media sites to collect information. The content aggregation unit 205 can be configured to identify new content based on day and/or time that the content was posed (if available) or through other means, such as creating a hash value for content and comparing that with a previously calculated hash value to determine whether the content has been changed.

Synthetic content that includes the publically available information and no sensitive information or fake sensitive information can be generated (stage 610). The content generation unit 215 can be configured to generate synthetic content that incorporates the publicly available content collected by the content aggregation unit 205. The synthetic content can be generated and stored by the content generation unit 215 until the content is needed to populate a simulated computing environment on the security system 150. The synthetic content can also be generated at least in part in real time based on the actions taken by an unauthorized user interacting with the simulated computing environment or with the service provider 125 prior to the unauthorized user being transferred over to the simulated computing environment provided by the security system 150.

FIG. 7 is a flow diagram of an example process for generating synthetic content according to the techniques discussed herein. The process illustrated in FIG. 4 can be implemented using the security system illustrated in FIGS. 1 and 2, unless otherwise specified. The content synthesizer 140 of the security system 150 can provide means for performing the various stages of the process illustrated in FIG. 7 unless otherwise specified. The process illustrated in FIG. 7 can be used to implement, at least in part, stage 605 of the process illustrated in FIG. 6.

Crawling through the publicly available content associated with the server (stage 705). The content aggregation unit 205 can be configured to automatically collect information by periodically crawling a list of web pages, blogs, discussion forums, newsgroups, social media sites to collect information, and/or other publicly available sources of information provided by the service provider 125 and/or other sources content.

Newly added or updated publicly available content associated with the server can be identified (stage 710). The content aggregation unit 205 can be configured to identify new content based on day and/or time that the content was posed (if available) or through other means, such as creating a hash value for content and comparing that with a previously calculated hash value to determine whether the content has been changed.

Figure 8:
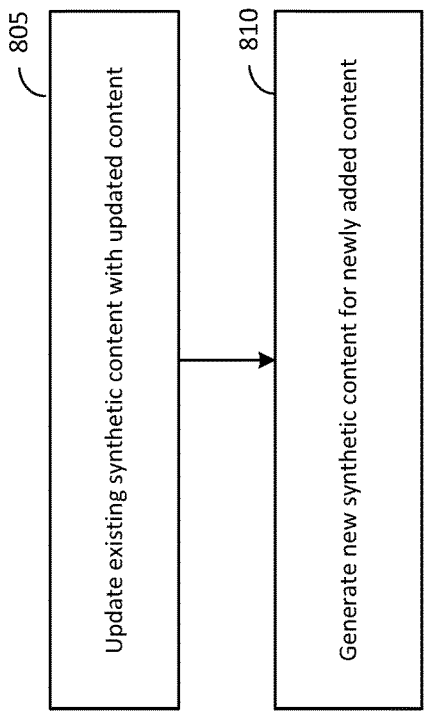
FIG. 8 is a flow diagram of an example process for generating synthetic content according to the techniques discussed herein.

FIG. 8 is a flow diagram of an example process for generating synthetic content according to the techniques discussed herein. The process illustrated in FIG. 4 can be implemented using the security system illustrated in FIGS. 1 and 2, unless otherwise specified. The content synthesizer 140 of the security system 150 can provide means for performing the various stages of the process illustrated in FIG. 8 unless otherwise specified. The process illustrated in FIG. 8 can be used to implement, at least in part, stage 610 of the process illustrated in FIG. 6.

Existing synthetic content can be updated with updated content (stage 805). The content synthesizer 140 can be configured to update existing synthetic content stored in a persistent memory of the security system 150 based on the updates that were made to the synthetic content. Content can be added, modified, and/or deleted based on changes that were made to the publicly available content used to generate the synthetic content.

New synthetic content can be generated for newly added content (stage 810). The content synthesizer 140 can be configured to generate new synthetic content for newly added content. The content synthesizer 140 can be configured to store the content that has been generated in persistent memory of the security system 150 until the content is needed by the content synthesizer 140 in response to an unauthorized user being transferred to the security system from the service provider 125.

Figure 9:
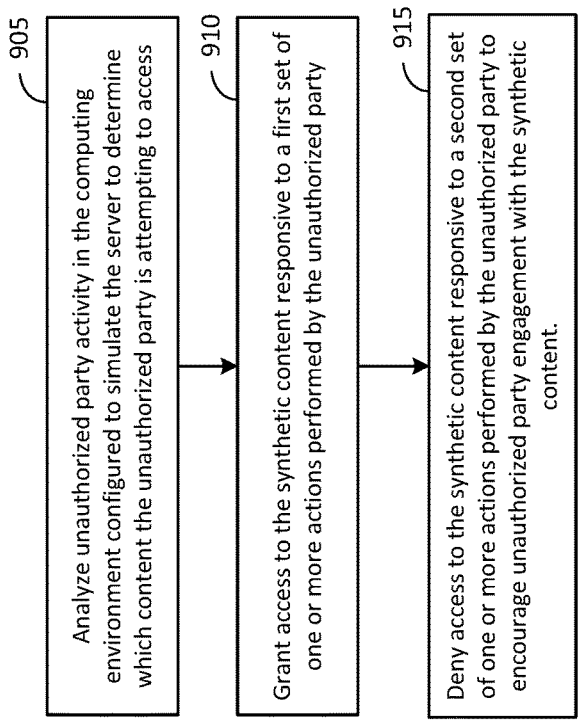
FIG. 9 is a flow diagram of an example process for controlling access to synthetic content according to the techniques discussed herein.

FIG. 9 is a flow diagram of an example process for controlling access to synthetic content according to the techniques discussed herein. The process illustrated in FIG. 4 can be implemented using the security system illustrated in FIGS. 1 and 2, unless otherwise specified. The content synthesizer 140 of the security system 150 can provide means for performing the various stages of the process illustrated in FIG. 5 unless otherwise specified. The process illustrated in FIG. 9 can be used to implement, at least in part, stage 415 of the process illustrated in FIG. 4.

The activities of the unauthorized party can be analyzed in the computing environment configured to simulate the server to determine which content the unauthorized party is attempting to access and the methods the unauthorized party uses to access the contents (stage 905). The content synthesizer 140 of the security system 150 can be configured to monitor the interactions of the unauthorized party with the simulated computing environment provided by a honeypot 135 of the security system 150. The activities monitored can include commands issued to one or more components of the simulated computing environment, queries issued to one or more databased, files and/or portions of a file system of the simulated environment accessed by the unauthorized party, types of attacks that were attempted by the unauthorized party on one or more components of the simulated computing environment, the types of data accessed, and/or other information regarding the unauthorized party's interactions with the simulated computing environment provided by the honeypot 135.

Grant access to the synthetic content responsive to a first set of one or more actions performed by the unauthorized party (stage 910). The synthetic content can be made accessible to the unauthorized party to distract the unauthorized party, to confuse the unauthorized party by including information contradictory to sensitive information included on the service provider 125 that was accessed by the unauthorized party before the unauthorized access was detected, and to keep the unauthorized party engaged with the security system 150 to determine what types of the information that the unauthorized party is interested in obtaining from the service provider 125 and the techniques used to obtain such information. The content synthesizer 140 can be configured to engage the attention of the unauthorized by the granting access to a least a portion of the synthetic content responsive to certain actions. The use of the term "granting" access herein can include displaying the content to the unauthorized user, providing access to a "database" of synthetic content, allowing the user to query and/or update the database, allowing the user to access or update "configuration" data for the service provider 125, provide access to a portion of the simulated file system or files stored in therein. The simulated computing environment provided by the honeypot 135 can include simulations of database that appear to be real or a real database comprising content synthetic content from which sensitive information has been expunged and/or contradictory information has been added. The simulated computing environment can also provide a simulated file system and/or files that the unauthorized user can be permitted to access responsive to one or more actions observed by the content synthesizer 140. The content synthesizer 140 can be configured to respond to certain types of attacks by the unauthorized party such that the attack appears to be successful by generating synthetic content that mimics the type of information that such a successful attack would provide to the unauthorized party. The unauthorized party has to work to obtain the information, which can help keep the unauthorized party engaged with the simulated environment.

Deny access to the synthetic content responsive to a second set of one or more actions performed by the unauthorized party to encourage unauthorized party engagement with the synthetic content (sage 915). The content synthesizer 140 can be configured to engage the attention of the unauthorized by the denying access to a least a portion of the synthetic content responsive to certain actions. The use of the term "denying" access herein can include generating a responsive to an action by the unauthorized party in the simulated computing environment that a particular action or type of attack was unsuccessful. By blocking certain types of attacks, the unauthorized party has to work harder to obtain access to the synthetic content, which can help engage the attention of the unauthorized party and can make the simulation appear more like a real computing environment which would be configured to prevent certain actions or attacks.

FIG. 10 is a flow diagram of an example process for generating synthetic content according to the techniques discussed herein. The process illustrated in FIG. 10 can be implemented using the security system illustrated in FIGS. 1 and 2, unless otherwise specified. The content synthesizer 140 of the security system 150 can provide means for performing the various stages of the process illustrated in FIG. 5 unless otherwise specified. The process illustrated in FIG. 6 can be used to implement, at least in part, additional stages of the process illustrated in FIG. 4.

State information for a user session can be received from a network device associated with the server responsive to the second security device detecting unauthorized activity (stage 1005). The security device 120 can send information indicative of a state of a user session associated with an unauthorized user of the service provider 125. The information can include state information of the service provider, data associated with the unauthorized user's interaction with the service provider 125, and other information that can be used to create a simulation of the current state of the computing environment of the service provider 125 at the security system 150. The honey farm master 130 can be configured to receive the information from the service provider 125 and to select a honeypot 135 from the available honeypots on which to establish the simulated computing environment.

A duplicate user session can be established on the security system (stage 1010). The security system 150 can be configured to use the information provided by the security device 120 and/or the service provider 125 regarding the state of the user session to complete setting up of the simulated computing environment on the honeypot 135. The security system 150 may be configured to maintain at least one honeypot configured in a state ready to simulate the computing environment of the service provider 125 so that the handover from the security device 120 to the security system 150 can be completed more quickly. The information received from the security device 120 can be used to configure aspects of the pre-configured simulated computing environment that differ from the computing environment of the service provider 125 so that the simulated computing environment mimics the computing environment of the service provider 125 before the handover.

Network traffic associated with the user session can be routed to the duplicate user session at the security device (stage 1015). The security system 150 and/or the security device 120 can be configured to update one or more routing tables such that network traffic from the computing device of the unauthorized user is routed to the security system 150 instead of the service provider 125. The security system 150 and/or the security device 120 can be configured to broadcast updates to the routing tables over the network 110 so that other devices that may be routing network traffic from the computing device of the unauthorized party to the service provider 125 also route further network traffic from the unauthorized user to the security system 150 instead of the service provider 125.

FIG. 11 is a flow diagram of an example process for protecting a server according to the techniques discussed herein. The process illustrated in FIG. 11 can be implemented using the security system illustrated in FIGS. 1 and 2, unless otherwise specified. The honey farm master 130 of the security system 150 can provide means for performing the various stages of the process illustrated in FIG. 11 unless otherwise specified. The process illustrated in FIG. 11 can be used to implement, at least in part, additional stages of the process illustrated in FIG. 4.

Activities of the unauthorized party with the duplicate user session can be analyzed to identify one or more types of attempted attack on the server (stage 1105). As discussed above, the honey farm master 130, the content generation unit 215, and/or other components of the content synthesizer 140 can be configured to monitor the activity of the unauthorized party as the unauthorized party interacts with the simulated computing environment provided by the security system 150. The activities monitored can include commands issued to one or more components of the simulated computing environment, queries issued to one or more data-based, files and/or portions of a file system of the simulated environment accessed by the unauthorized party, types of attacks that were attempted by the unauthorized party on one or more components of the simulated computing environment, the types of data accessed, and/or other information regarding the unauthorized party's interactions with the simulated computing environment provided by the honeypot 135 of the security system 150.

Configuration information for the network device can be generated based on the one or more types of attempted attack on the server (stage 1110). Configuration information that can be used to configure one or configuration settings of the security device 120 to prevent attacks of the types observed in the simulated computing environment.

A configuration message can be sent to the network device to change one or more configuration settings based on the configuration information (stage 1115). A message that includes the configuration information can be sent to the across a network connection between the security system 150 and the security device 120. The network connection may be over the network 110. The security device 120 can be configured to receive the configuration information and to reconfigured one or more operating parameters of the security device 120 to that may help to prevent future attacks of the type observed in the simulated computing environment.

Figures 12, 13:
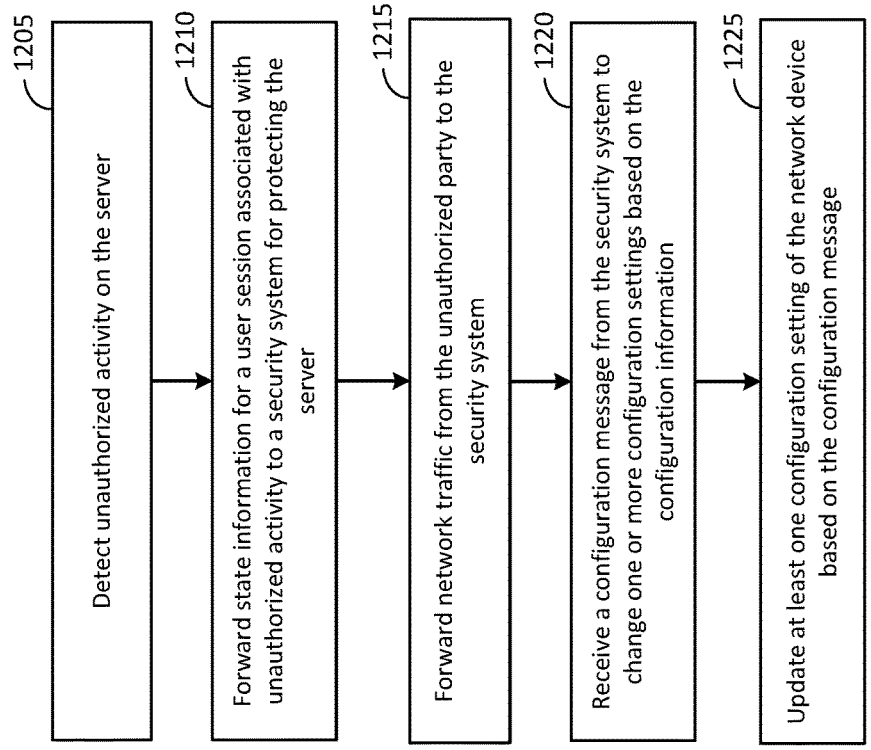
FIG. 12 is a flow diagram of an example process for protecting a server according to the techniques discussed herein.
FIG. 13 is a flow diagram of an example process for protecting a server according to the techniques discussed herein.

FIG. 12 is a flow diagram of an example process for protecting a server according to the techniques discussed herein. The process illustrated in FIG. 12 can be implemented using the security device 120 illustrated in FIGS. 1 and 2, unless otherwise specified.

Unauthorized activity on the server can be detected (stage 1205). The security device 120 can be configured to monitor the incoming the incoming and outgoing network traffic to detect unauthorized activity on the service provider 125. Other detection techniques, as discussed above can also be used by the security device 120. In response to detecting unauthorized activity, the security device 120 can be configured to alert the security system 150 that an unauthorized access has been detected. The security device 120 can be configured to forward state information for a user session between the client device 105 and the service provider 125 in which activity by the unauthorized user was detected. The security device 120 can also be configured to route network traffic received from the client device 105 to the security system 150.

State information for a user session associated with unauthorized activity to a security system for protecting the server can be forwarded to the security system (stage 1210). The security device 120 and/or the service provider 125 can be configured to send state information for a user session associated with the unauthorized user at the service provider 125 to the security system 150 responsive to the security device 120 detecting the unauthorized activity. The honey farm master 130 can be configured to receive the state information, to select a honeypot from the honeypots maintained by the security system 150, and to instantiate a duplicate user session based on the state information received from the security device 120.

Network traffic from the unauthorized party can be forwarded to the security system (stage 1215). As discussed above, the security device 120 can be configured to update the routing tables maintained by the security device 120 and can also be configured to broadcast updates to the routing tables to other devices that maintain such routing tables, so that future network traffic from the unauthorized party is routed to the security system 150.

A configuration message can be received from the security system to change one or more configuration settings based on the configuration information (stage 1220). The configuration message can be sent by the security system 150 in response to monitoring the interactions of the unauthorized user with the simulated computing environment established on the security system 150. The configuration message can identify operating parameters of the security device 120 and/or the service provider 125 that can be updated to reduce vulnerabilities of these systems.

At least one configuration setting of the network device can be updated based on the configuration message (stage 1225). The configuration information included in the configuration message can identify one or more operating parameters of the security device 120 and/or the service provider 125 that can be updated to reduce potential vulnerabilities identified by the security system 150 when monitoring the activities of the unauthorized party.

FIG. 13 is a flow diagram of an example process for protecting a server according to the techniques discussed herein. The process illustrated in FIG. 13 can be implemented using the security device 120 illustrated in FIGS. 1 and 2, unless otherwise specified. The process illustrated in FIG. 13 can be used to implement, at least in part, stage 1215 of the process illustrated in FIG. 12. The process illustrated in FIG. 12 can include stage 1205, stage 1210, or both. The process illustrated in FIG. 12 can be used, at least in part, to seamlessly forward the network traffic of an unauthorized party to the security system 150. The process can be done covertly without the knowledge of the unauthorized party so that the unauthorized party is unaware that they are now interacting with a simulated computing environment that mimics the computing environment of the service provider 125.

One or more routing tables can be updated by broadcasting a preferred routing path for traffic associated with the unauthorized activity (stage 1305). The security device 120 can be configured to maintain one or more routing tables that are configured to route traffic to the service provider 125 and/or other network devices that located on a trusted and secure network separated from the network 110. The security device 120 can be configured to update the one or more routing tables to route packets received from the unauthorized user to the security system 150. The security device 120 can be configured to identify a source network address of network traffic associated with the unauthorized user and to update one or more routing tables associated with the security device 120 to route traffic received from that source network address and with the a destination address of the service provider 125 to the security system 150. In some implementations, the security system 150 can be assigned a network address that falls within an Internet Protocol (IP) subnet of the service provider 125 to help thwart detection of the redirection of the network traffic from the unauthorized user to the security system 150. The service provider 125 and the security system 150 can be configured to be part of an Autonomous System (AS) comprising a set IP routing prefixes that present a common and clearly defined routing policy to the network 110. The routing policy can be updated to route traffic from the computing device of the unauthorized party to the security system 150.

The security device 120 can also be configured to broadcast updates to the one or more routing tables to other network devices that maintain routing tables so that the other network can also update their routing tables so that network traffic from computing device of the unauthorized user can be routed to the security system 150 instead of the service provider 125. The broadcast update can be a Routing Information Protocol (RIP) message or messages. Other routing protocols can also be used instead of or in addition to RIP.

One or more routing tables can be updated by broadcasting the preferred routing path for traffic associated with traffic having similar attributes as the unauthorized activity (stage 1310). The security device 120 can be configured to update the one or more routing tables to route traffic similar to the traffic rerouted in stage 1205 to the security system 150 for further analysis. Traffic having the same source network address as the unauthorized user can be routed to the security system 150. The security device 120 can also be configured to broadcast updates to the one or more routing tables to other network devices that maintain routing tables so that the other network can also update their routing tables so that network traffic from computing device of the unauthorized user can be routed to the security system 150 instead of the service provider 125.

Figure 14:
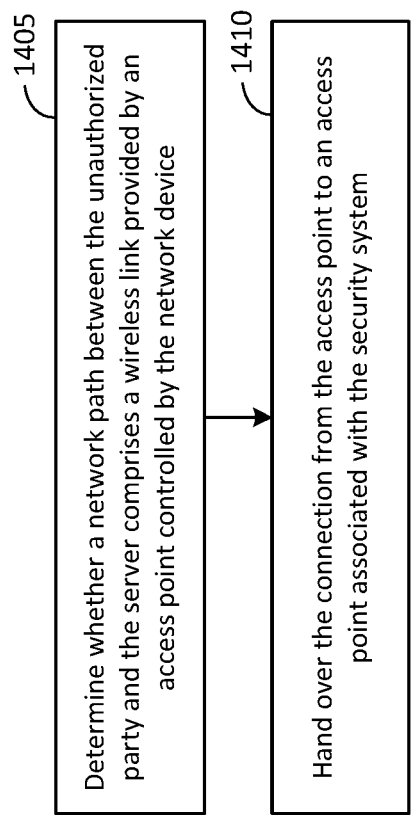
FIG. 14 is a flow diagram of an example process for protecting a server according to the techniques discussed herein.

FIG. 14 is a flow diagram of an example process for protecting a server according to the techniques discussed herein. The process illustrated in FIG. 13 can be implemented using the security device 120 illustrated in FIGS. 1 and 2, unless otherwise specified. The process illustrated in FIG. 13 can be used to implement, at least in part, stage 1215 of the process illustrated in FIG. 12.

A determination can be made whether a network path between the unauthorized party and the server comprises a wireless link provided by an access point controlled by the network device (stage 1405). The security device 120 can be configured to determine whether the network path between the unauthorized party and the service provider 125 includes an access point controlled by the security device 120. The security device 120 can be configured to determine whether there is a second wireless access point proximate to the computing device from which the unauthorized party is communicating with the service provider 125. The second wireless access point is a wireless access point that is a dedicated wireless access point maintained by the security system 150. The security system 150 can be configured to have a plurality of dedicated wireless access points disposed across a coverage area which can provide a wireless network connection between the security system 150 and computing devices from which an unauthorized party attempts to access the service provider 125. The dedicated wireless access point can comprise WLAN wireless access points, WAN base stations, and/or other types of wireless access point that provide the ability to send and receive wireless network data. The security system 150 can control the configuration of the dedicated wireless access points.

The connection can be handed over from the access point to an access point associated with the security system (stage 1410). The security system 150 can be configured to cause a handoff of a wireless network connection of the computing device of the unauthorized user to the dedicated wireless access point so that the security system 150 can monitor and control the network connection between the security system 150 and the computing device of the unauthorized user.

The methodologies described herein may be implemented by various means depending upon the application. For example, these methodologies may be implemented in hardware, firmware, software, or any combination thereof. For a hardware implementation, the processing units may be implemented within one or more application specific integrated circuits (ASICs), digital signal processors (DSPs), digital signal processing devices (DSPDs), programmable logic devices (PLDs), field programmable gate arrays (FPGAs), processors, controllers, micro-controllers, microprocessors, electronic devices, other electronic units designed to perform the functions described herein, or a combination thereof.

For a firmware and/or software implementation, the methodologies may be implemented with modules (e.g., procedures, functions, and so on) that perform the functions described herein. Any machine-readable medium tangibly embodying instructions may be used in implementing the methodologies described herein. For example, software codes may be stored in a memory and executed by a processor unit. Memory may be implemented within the processor unit or external to the processor unit. As used herein the term "memory" refers to any type of long term, short term, volatile, nonvolatile, or other memory and is not to be limited to any particular type of memory or number of memories, or type of media. Tangible media include one or more physical articles of machine readable media, such as random access memory, magnetic storage, optical storage media, and so on.

If implemented in firmware and/or software, the functions may be stored as one or more instructions or code on a computer-readable medium. Examples include computer-readable media encoded with a data structure and computer-readable media encoded with a computer program. Computer-readable media includes physical computer storage media. A storage medium may be any available medium that can be accessed by a computer. By way of example, and not limitation, such computer-readable media can comprise RAM, ROM, EEPROM, CD-ROM or other optical disk storage, magnetic disk storage or other magnetic storage devices, or any other medium that can be used to store desired program code in the form of instructions or data structures and that can be accessed by a computer; disk and disc, as used herein, includes compact disc (CD), laser disc, optical disc, digital versatile disc (DVD), floppy disk and Blu-ray disc where disks usually reproduce data magnetically, while discs reproduce data optically with lasers. Combinations of the above should also be included within the scope of computer-readable media. Such media also provide examples of non-transitory media, which can be machine readable, and wherein computers are an example of a machine that can read from such non-transitory media.

The generic principles discussed herein may be applied to other implementations without departing from the spirit or scope of the disclosure or claims.

What is claimed is:

1. A method for operating a security system for protecting a server, the method comprising:
   aggregating publicly available and non-publicly available information associated with the server;
   generating one or more models for generating synthetic content based on the aggregate information;
   monitoring interactions of an unauthorized party with a computing environment configured to simulate the server;
   generating synthetic content based on the unauthorized party's interactions with the computing environment and the one or more models; and
   configuring the security system to permit the unauthorized party to access the synthetic content responsive to the unauthorized party's interactions with the security system.

2. The method of claim 1, wherein generating the synthetic content further comprises:
   generating the synthetic content to comprise content associated with content accessed by the unauthorized party on the server.

3. The method of claim 2, wherein generating the synthetic content further comprises:
   identifying sensitive content accessed by the unauthorized party on the server before unauthorized access was identified; and
   generating the synthetic content comprising information contradictory to the content on the server accessed by the unauthorized party.

4. The method of claim 2, wherein generating the synthetic content further comprises:
   generating the synthetic content to comprise content publicly available from the server.

5. The method of claim 4, wherein generating the synthetic content further comprises:
   monitoring publicly available content associated with the server; and
   generating the synthetic content comprising the publicly available content associated with the server that contains no sensitive information or fake sensitive information.

6. The method of claim 5, wherein configuring the security system to permit the unauthorized party to access the synthetic content responsive to the unauthorized party's interactions with the security system further comprises:

making the synthetic content comprising contradictory information accessible responsive to the unauthorized party accessing information associated with the sensitive information; and making the synthetic content comprising the publicly available content accessible responsive to the unauthorized party accessing information not related to the sensitive information.

7. The method of claim 6, further comprising:
periodically crawling through publicly available content associated with the server; and
updating the synthetic content based on the publicly available content.

8. The method of claim 1, wherein generating the synthetic content based on the unauthorized party's interactions with the computing environment further comprises:
analyzing unauthorized party activity in the computing environment configured to simulate the server to determine which content the unauthorized party is attempting to access and methods the authorized party used to access the content;
granting access to the synthetic content responsive to a first set of one or more actions performed by the unauthorized party; and
denying access to the synthetic content responsive to a second set of one or more actions performed by the unauthorized party to encourage unauthorized party engagement with the synthetic content.

9. The method of claim 1, further comprising:
receiving state information for a user session from a second security device associated with the server responsive to the second security device detecting unauthorized activity associated with the user session;
establishing a duplicate user session on the security system; and
routing network traffic associated with the user session to the duplicate user session at the security system.

10. The method of claim 9, further comprising:
analyzing activities of the unauthorized party with the duplicate user session to identify one or more types of attack;
generating configuration information for the second security device based on the one or more types of attack on the server; and
sending a configuration message to the second security device to change one or more configuration settings based on the configuration information.

11. The method of claim 10, wherein the configuration information comprises at least one of a rule for determining whether to block a particular activity performed by a user and a signature for identifying that an attack on the server is being undertaken.

12. The method of claim 1, wherein the one or more models comprise a statistical language model comprising a probability distribution representing a distribution of words, word sequences, or both, in the publicly available and the non-publicly available sensitive information.

13. A security system comprising:
means for aggregating publicly available and non-publicly available information associated with a server;
means for generating one or more models for generating synthetic content based on the aggregate information;
means for monitoring interactions of an unauthorized party with a computing environment configured to simulate the server;
means for generating synthetic content based on the unauthorized party's interactions with the computing environment and the one or more model; and
means for configuring the security system to permit the unauthorized party to access the synthetic content responsive to the unauthorized party's interactions with the security system.

14. The security system of claim 13, wherein the means for generating the synthetic content further comprises:
means for generating the synthetic content to comprise content associated with content accessed by the unauthorized party on the server.

15. The security system of claim 14, wherein the means for generating the synthetic content further comprises:
means for identifying sensitive content accessed by the unauthorized party on the server before unauthorized access was identified; and
means for generating the synthetic content comprising information contradictory to the content accessed by the unauthorized party on the server.

16. The security system of claim 14, wherein the means for generating the synthetic content further comprises:
means for generating the synthetic content to comprise content publicly available from the server.

17. The security system of claim 16, wherein the means for generating the synthetic content further comprises:
means for monitoring publicly available content associated with the server; and
means for generating the synthetic content comprising the publicly available content associated with the server that contains no sensitive information or fake sensitive information.

18. The security system of claim 17, wherein the means for configuring the security system to permit the unauthorized party to access the synthetic content responsive to the unauthorized party's interactions with the security system further comprises:
means for making the synthetic content comprising the contradictory information accessible responsive to the unauthorized party accessing information associated with the sensitive information; and
means for making the synthetic content comprising the publicly available content accessible responsive to the unauthorized party accessing information not related to the sensitive information.

19. A security system comprising:
a memory; and
a processor communicatively coupled to the memory and configured to:
aggregate publicly available and non-publicly available information associated with the server;
generate one or more models for generating synthetic content based on the aggregate information;
monitor interactions of an unauthorized party with a computing environment configured to simulate a server;
generate synthetic content based on the unauthorized party's interactions with the computing environment and the one or more models; and
configure the security system to permit the unauthorized party to access the synthetic content responsive to the unauthorized party's interactions with the security system.

20. The security system of claim 19, wherein the processor is further configured to:

generate the synthetic content to comprise content associated with content accessed by the unauthorized party on the server.

21. The security system of claim 20, wherein the processor being configured to generate the synthetic content is further configured to:
identify sensitive content accessed by the unauthorized party on the server before unauthorized access was identified; and
generate the synthetic content comprising information contradictory to the content accessed by the unauthorized party on the server.

22. The security system of claim 20, wherein the processor being configured to generate the synthetic content is further configured to:
generate the synthetic content to comprise content publicly available from the server.

23. The security system of claim 22, wherein the processor being configured to generate the synthetic content is further configured to:
monitor publicly available content associated with the server; and
generate the synthetic content comprising the publicly available content associated with the server that contains no sensitive information or fake sensitive information.

24. The security system of claim 23, wherein the processor being configured to configure the security system to permit the unauthorized party to access the synthetic content responsive to the unauthorized party's interactions with the security system is further configured to:
make the synthetic content comprising the contradictory information accessible responsive to the unauthorized party accessing information associated with the sensitive information; and
make the synthetic content comprising the publicly available content accessible responsive to the unauthorized party accessing information not related to the sensitive information.

25. The security system of claim 24, wherein the processor is further configured to:
periodically crawl through publicly available content associated with the server; and
update the synthetic content based on the publicly available content.

26. A non-transitory, computer-readable medium, having stored thereon computer-readable instructions operating a security system for protecting a server, comprising instructions configured to cause the security system to:
aggregate publicly available and non-publicly available information associated with the server;
generate one or more models for generating synthetic content based on the aggregate information;
monitor interactions of an unauthorized party with a computing environment configured to simulate the server;
generate synthetic content based on the unauthorized party's interactions with the computing environment and the one or more model; and
configure the security system to permit the unauthorized party to access the synthetic content responsive to the unauthorized party's interactions with the security system.

27. The non-transitory, computer-readable medium of claim 26, wherein the instructions configured to cause the security system to generate the synthetic content further comprise instructions configured to cause the security system to:
generate the synthetic content to comprise content associated with content accessed by the unauthorized party on the server.

28. The non-transitory, computer-readable medium of claim 27, wherein the instructions configured to cause the security system to generate the synthetic content further comprise instructions configured to cause the security system to:
identify sensitive content accessed by the unauthorized party on the server before unauthorized access was identified; and
generate the synthetic content comprising information contradictory to the content accessed by the unauthorized party on the server.

29. The non-transitory, computer-readable medium of claim 27, wherein the instructions configured to cause the security system to generate the synthetic content further comprise instructions configured to cause the security system to:
generate the synthetic content to comprise content publicly available from the server.

30. The non-transitory, computer-readable medium of claim 29, wherein the instructions configured to cause the security system to generate the synthetic content further comprise instructions configured to cause the security system to:
monitor publicly available content associated with the server; and
generate the synthetic content comprising the publicly available content associated with the server that contains no sensitive information or fake sensitive information.

31. The non-transitory, computer-readable medium of claim 30, wherein the instructions configured to cause the security system to configure the security system to permit the unauthorized party to access the synthetic content responsive to the unauthorized party's interactions with the security system further comprise instructions configured to cause the security system to:
make the synthetic content comprising the contradictory information accessible responsive to the unauthorized party accessing information associated with the sensitive information; and
make the synthetic content comprising the publicly available content accessible responsive to the unauthorized party accessing information not related to the sensitive information.

* * * * *